(No Model.) 2 Sheets—Sheet 1.
W. H. & H. SMITH.
PLOW.
No. 410,121. Patented Aug. 27 1889.
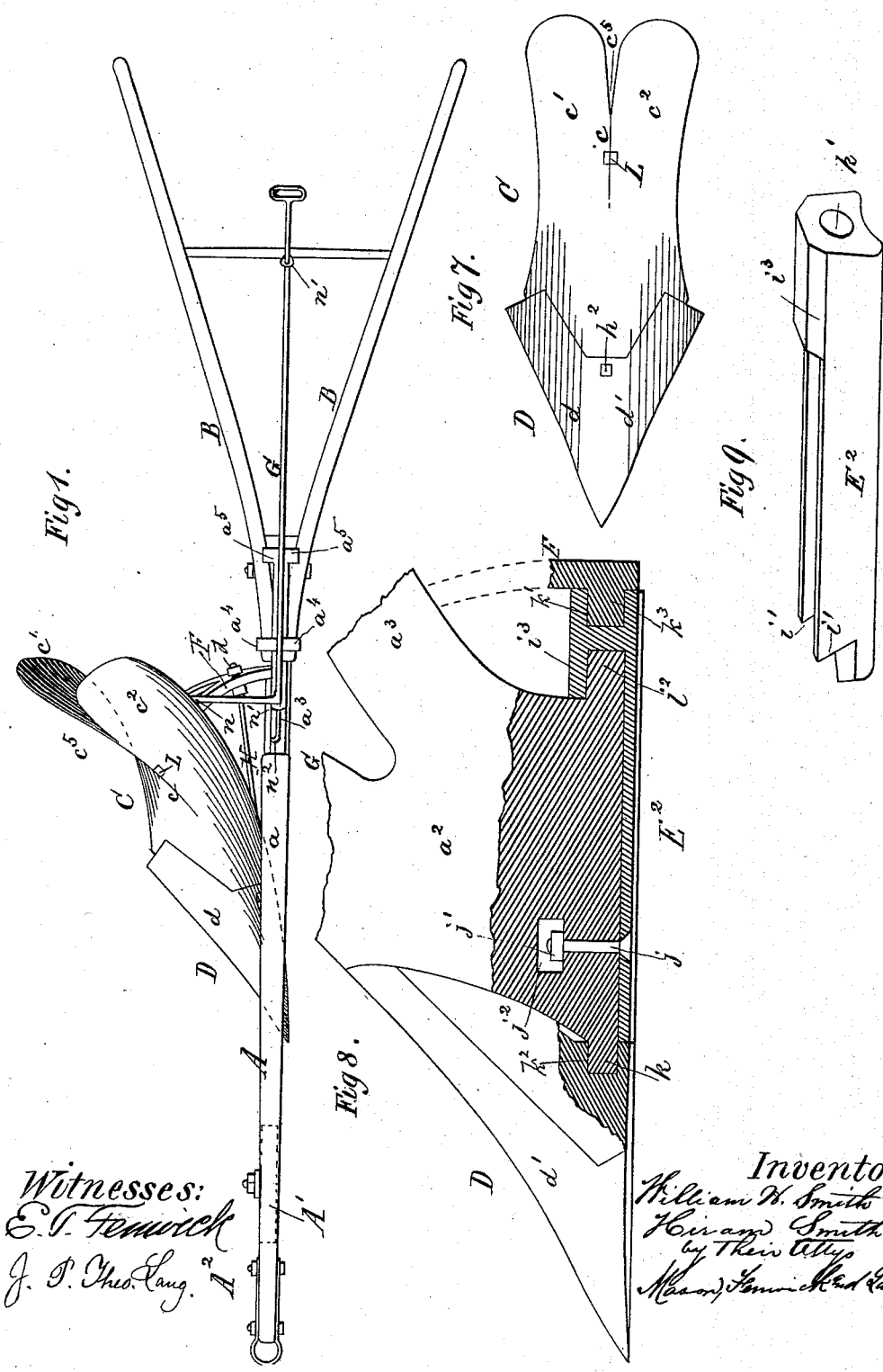
Witnesses:
E. T. Fenwick
J. P. Theo. Lang.
Inventor:
William H. Smith
Hiram Smith
by Their Attys
Mason, Fenwick & Lawrence

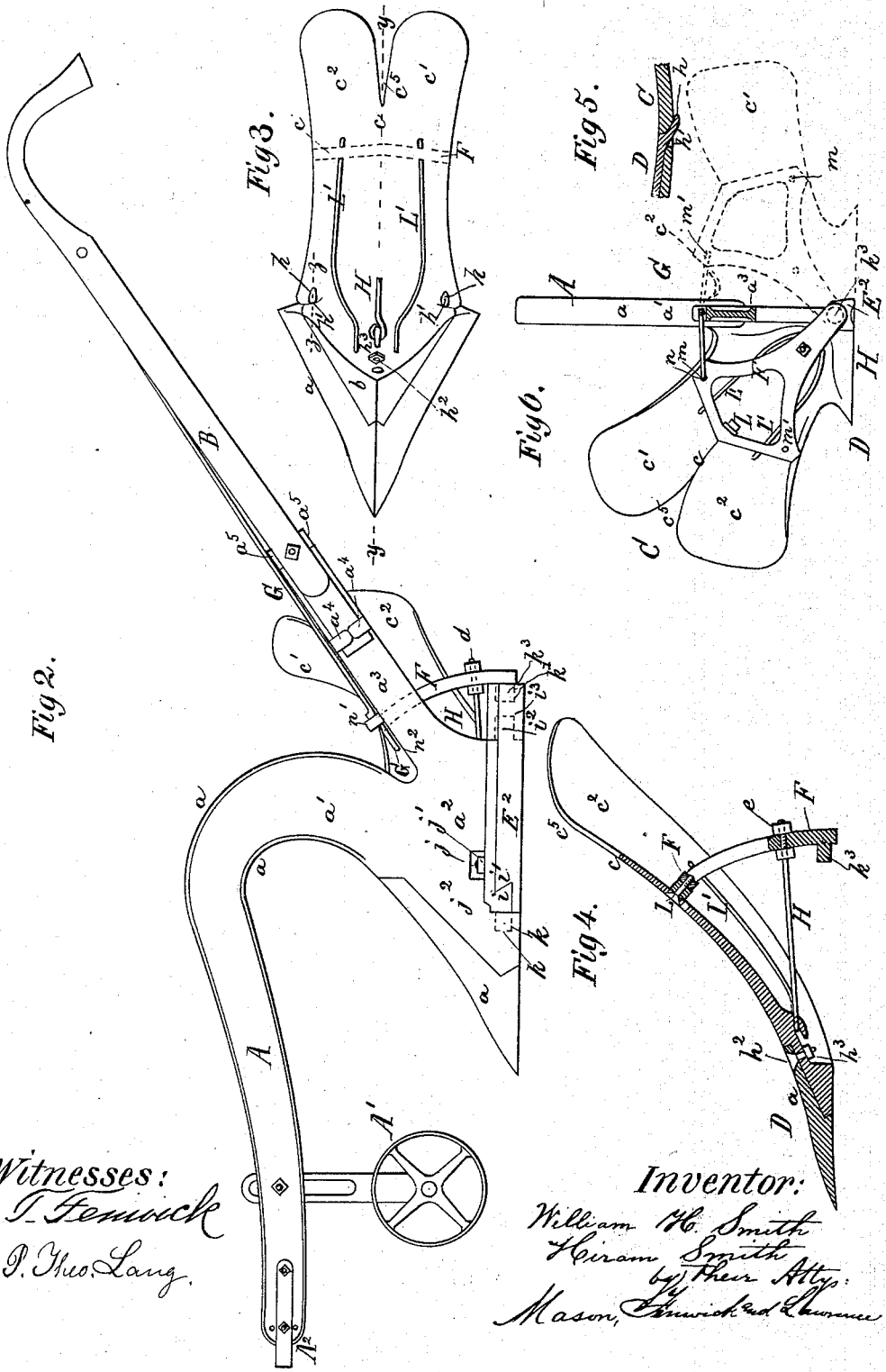

UNITED STATES PATENT OFFICE.

WILLIAM HENRY SMITH AND HIRAM SMITH, OF DICKSON, PENNSYLVANIA; SAID HIRAM SMITH ASSIGNOR TO SAID WILLIAM HENRY SMITH.

PLOW.

SPECIFICATION forming part of Letters Patent No. 410,121, dated August 27, 1889.

Application filed May 29, 1889. Serial No. 312,499. (No model.)

*To all whom it may concern:*

Be it known that we, WILLIAM HENRY SMITH and HIRAM SMITH, both citizens of the United States, residing at Dickson, in the county of Lackawanna and State of Pennsylvania, have invented certain new and useful Improvements in Reversible Duplex Mold-Board Plows; and we do hereby declare the following to be a full, clear, and exact description of the invention, such as will enable others skilled in the art to which it appertains to make and use the same.

Our invention relates to reversible or duplex mold-board plows which have a single point or share and are well adapted for both hillside and level plowing, enable a plowman to plow a field without any dead furrows, and avoids the necessity of going around the field, admits of going back and forth on the same side of the field, and thus plowing the furrows immediately alongside one another; and it consists in certain novel constructions, combinations, and arrangements of parts in plows of the class mentioned, as will be hereinafter fully described and claimed, whereby the same are improved and rendered more useful and convenient of manipulation.

In the accompanying drawings, Figure 1 is a top view of our improved plow; Fig. 2, a side view of the same as viewed from the land side. Fig. 3 is an inverted view of the mold-board and share or point and part of the connecting-rod thereof separate from the other parts on which they are supported and adjusted. Fig. 4 is a central longitudinal section of the mold-board, share, connecting-rod, and supporting centering-bracket. Fig. 5 is a detail section in the line $z$ $z$, Fig. 3, showing a fastening between the share and the mold-board as an adjunct to the screw-fastening. Fig. 6 is a rear view of the plow, the handle-bracket of the beam being shown in cross-section. Fig. 7 is a top view of the mold-board and share shown in Fig. 3. Fig. 8 is a broken enlarged longitudinal section of the plow, and Fig. 9 is a perspective view of the sole or slade and landside bar of the plow.

A in the drawings represents a cast or other metal beam carrying an adjustable depth-gaging wheel $A'$ and an adjustable clevis $A^2$. This beam is constructed with a high backward curvature $a$ at the point where it begins to form the standard, and this is for allowing a freedom of escape of weeds and coarse grass and thereby rendering the plow practically self-clearing. The downwardly and forwardly curved portion of this beam forms, with the broader portion $a^2$, the standard, and from the rear of the standard a bracket-arm $a^3$ extends backward for the attachment thereto of the handles B, said bracket having on each side handle-clasping lugs $a^4$ and staying stop-lugs $a^5$, as shown.

C represents the mold-board, and D the point or share. The mold-board and point or share may be said to resemble in general form similar parts of a duplex mold-board-shovel cultivator-plow as adapted for use directly in front of a standard, or as when viewed as represented in Figs. 3 and 7, the mold-board having a ridge $c$, terminating in a split $c^5$ at its middle, and two symmetrical twisted or curved wings $c'$ $c^2$, one of which is on the right-hand and the other on the left-hand side of the ridge, as shown, and the share having a depressed concave form or two beveled surfaces $d$ $d'$, one of which is on the right hand and the other on the left hand of the center line $y$ $y$ of its width when viewed as in Figs. 3 and 7.

The point or share D when applied to the standard $a^2$ presents a horizontal sole-surface, a vertical landside-surface, and an inwardly-curved oblique furrow-side surface, as shown in Figs. 1, 2, 4, 6, and 8, and this is the case whether the plow is adjusted for making its forward or return trip, and the mold-board when applied to the standard presents two oblique sod or earth directing and discharging surfaces, one twisted toward and the other from the land side of the standard, and this is the case whether the plow is adjusted for making its forward or return trip, and therefore the share and the mold-board can be made to operate for turning furrows on either the right or left hand side of the standard $a^2$, the mold-board wing $c^2$ remaining idle when the wing $c'$ is in action and the wing $c'$ remaining idle when the wing $c^2$ is in action.

By referring to Fig. 5 of the drawings it will be seen that the point or share D is formed with a locking-tongue $h$, and the mold-board C with a slot $h'$ through it, and that the tongue is inserted into the slot and made to bind underneath the mold-board, and thus when the screw $h^2$, which fastens the point or share to the mold-board, is inserted and confined by a nut $h^3$ the mold-board and share are kept very firmly together and in position with respect to each other, and by referring to Figs. 2, 6, and 8 it will be seen that the thus united point or share D and mold-board C are connected pivotally to the standard, this being accomplished, preferably, by the following-described means: To the bottom of the standard $a^2$ a steel or other grooved metal sole-bar or slade $E^2$ is fitted by means of beveled shoulders $i$ $i'$, formed, respectively, on the sole-bar and the standard, and by a tongue $i^2$ and socket $i^3$, also formed, respectively, on and in the standard and sole-bar, and said sole bar is held in place and from turning on the standard by a screw-bolt $j$, whose nut $j'$ is accessible through a horizontal slot $j^2$ in the standard.

On the front end of the standard, just at the base, a short pivot-extension $k$ is provided, and in the rear end of the sole-bar $E^2$ a shallow horizontal socket $k'$ is formed. The pivot-extension $k$ enters a corresponding socket $k^2$ formed in the mold-board casting, and into the socket $k'$ a pivot $k^3$ of a skeleton supporting-bracket F is fitted. The bracket F is shaped at its upper side to the under surface of the duplex mold-board, and to it said mold-board is firmly bolted at L, being also sustained by notched ribs L' of the mold-board.

At the sides of the bracket longitudinal locking-holes $m$ $m'$ are provided, and into one or the other of the two holes a bolt $n$ of a turning and sliding locking-rod G enters whenever the mold-board and point or share are changed from the right to the left hand side of the standard, or from the left to the right hand side thereof. The bracket is stayed and its pivot kept in the socket of the sole-bar by means of a screw connecting-rod H, hinged to the under side of the mold-board, passed through the bracket F at the center of its width, and secured by a nut, as shown. The locking-rod G is fitted to slide in eyes $n'$ upon respectively the connecting cross-bar of the handles and the handle-bracket, to which the handles are attached, and at its rear end, which is convenient for manipulation by the plowman while he is controlling his team. It is formed with a hand-loop, while on its forward end a limitation-stop $n^2$ and the bolt $n$ are formed, as shown, or in any other suitable equivalent way.

It will be understood that to change the mold-board and point or share from the position shown in full lines in Fig. 6 to that shown in dotted lines in same figure, the plowman while in full control of his team and in a central position can without bending his body accomplish it, it simply being necessary to draw back the rod G, so as to withdraw the bolt $n$ from the hole $m$, and thereby unlock the mold-board, and then to raise the rear portion of the beam and otherwise so manipulate it laterally by the plow-handles while the mold-board and share are resting upon the ground as to cause the mold-board and share to become reversed and occupy the position on the other side of the standard, as shown by dotted lines, whereupon the mold-board and share are again locked by sliding the rod forward after turning it, and thereby entering the bolt $n$ into the hole $m'$, and this operation is repeated when it becomes necessary to change the mold-board and share from the position shown in dotted lines to the position shown in full lines. When the mold-board and share have been reversed, the team is turned around and the plow moved forward immediately alongside the furrow last formed. The ridge $c$ and split $c^5$ between the wings of the mold-board insure the bringing of one sod or earth directing and discharging surface, as $c'$, into action, and the complete throwing of the other, as $c^2$, out of action, or the bringing of $c^2$ into action and the throwing of $c'$ out of action. The plow by having the duplex mold-board is better adapted for hillside plowing than other swivel-plows, while it answers just as well for level plowing.

When the sole-bar or slade becomes worn out, it can be replaced by another, and thus much of the expense of a new plow standard and beam will be saved; but as an equivalent of our detachable sole-bar for purposes of securing a horizontal longitudinal pivotal connection would be a sole-bar cast homogeneous with the standard, we do not confine ourselves to the detachable sole-bar. It is, however, far preferable in the light of economy to make it separate from the standard.

What we claim as our invention is—

1. In a reversible or duplex mold-board plow, the combination of the angular locking-rod G, provided with a longitudinal bolt $n$, and arranged both to slide and turn in its guiding-eyes, with a share or point, and a reversible angular mold-board having a supporting-bracket provided with longitudinal bolting-holes and connected to the standard portion of the plow by a longitudinal pivotal connection, substantially as and for the purpose described.

2. A reversible duplex mold-board plow comprising, in combination, the following parts, to wit: the united beam, standard, and handle-supporting bracket-arm, the beam being curved, as at $a$, and the standard provided with beveled shoulders $i'$, pivot $k$, and tongue or dowel $i^2$, the sole-bar $E^2$, having a tongue or dowel-socket $i^3$ and a pivot-socket $k'$, the uniting-bolt $j$, the pivot or share D, having a horizontal sole-surface, a vertical landside-surface, an inwardly-curved oblique surface, and a pivot-socket $k^2$, the supporting-bracket F matching on its upper end the under transverse shape of the duplex mold-board and having pivot $k^3$, the screw connecting-rod H, and the duplex mold-board C, formed for about one-third its length with a broad united body-surface extending from side to side and rearwardly of said portion formed with an inclined concaved parting-ridge $c$, the angle of which ridge gradually becomes more acute, and with symmetrical mold-board wings $c'$ $c^2$, the helical curved surfaces of which are separated completely by said ridge along the remaining length of the mold-board, and the locking-bolt, substantially as and for the purpose described.

3. In a reversible duplex mold-board plow, the combination of the mold-board having holes $h'$ extending entirely through it, the share having a tongue $h$ cast upon it and entering through said hole and bearing against the under side of the mold-board, and the uniting screw-bolt $h^2$, passed through the share and mold-board, substantially as described.

4. In a reversible duplex mold-board plow, the united curved beam and standard cast with a handle-supporting bracket-arm $a^3$, on which are cast the staying stop-lugs $a^5$, and the divided clasping-lugs $a^4$, substantially as described.

In testimony whereof we hereunto affix our signatures in presence of two witnesses.

WILLIAM HENRY SMITH.
HIRAM SMITH.

Witnesses:
F. G. WHEELER,
E. E. TAYLOR.

It is hereby certified that in Letters Patent No. 410,121, granted August 27, 1889, upon the application of William Henry Smith and Hiram Smith, of Dickson, Pennsylvania, for an improvement in "Plows," an error appears in the printed specification requiring correction as follows: In line 131, page 2, the word "pivot" should read *point*, and that the said Letters Patent should be read with this correction therein to make the same conform to the record of the case in the Patent Office.

Signed, countersigned, and sealed this 10th day of September, A. D. 1889.

[SEAL.]

CYRUS BUSSEY,
*Assistant Secretary of the Interior.*

Countersigned:

C. E. MITCHELL,
*Commissioner of Patents.*